July 15, 1947. G. E. DATH 2,423,877
SPRING AND FRICTION BUFFER FOR RAILWAY CARS
Filed Feb. 10, 1945
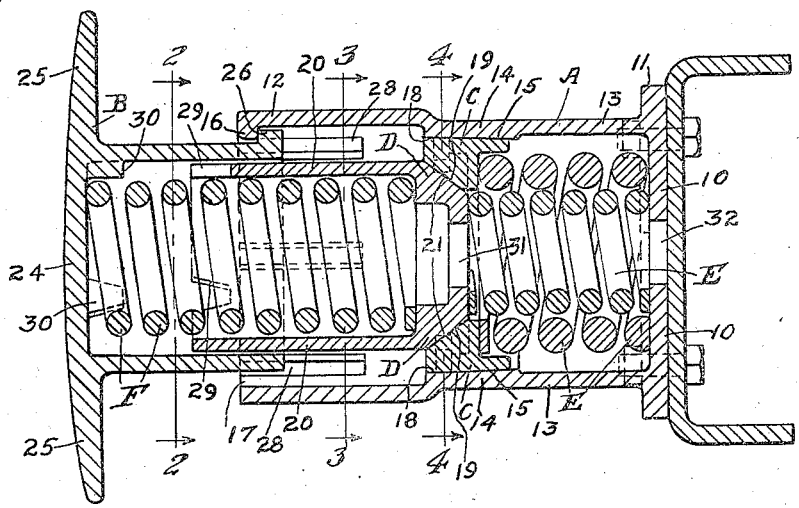
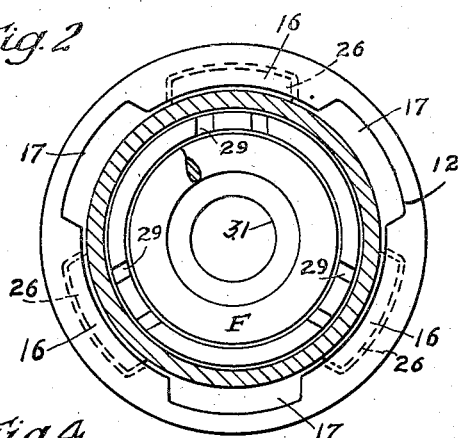
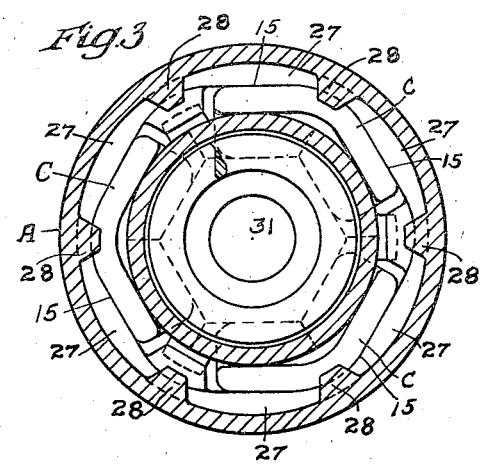
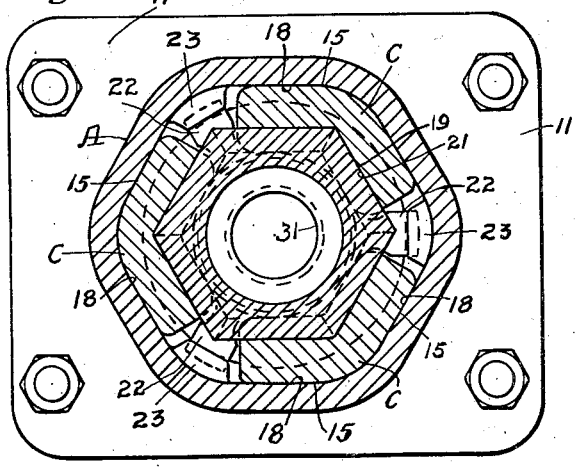
Inventor
George E. Dath
By Henry Fuchs
Atty.

Patented July 15, 1947

2,423,877

UNITED STATES PATENT OFFICE 2,423,877

SPRING AND FRICTION BUFFER FOR RAILWAY CARS

George E. Dath, Mokena, Ill., assignor to W. H. Miner, Inc., Chicago, Ill., a corporation of Delaware Application February 10, 1945, Serial No. 577,293

5 Claims. (Cl. 213—221)

1

This invention relates to improvements in buffers for railway cars.

One object of the invention is to provide a buffer mechanism for railway cars comprising a combined housing and friction shell secured to the end of the car; a slidable buffer head telescoped within the housing; a friction clutch slidable within the housing and engaging interior friction surfaces on the latter; spring means yieldingly opposing inward movement of the friction clutch; and a preliminary spring interposed between the buffer head and the friction clutch, wherein means is provided for holding the buffer head, combined housing and friction shell, and friction clutch against relative rotation during all stages of the operation of the mechanism, thereby assuring proper functioning of the device.

A further object of the invention is to provide a mechanism as set forth in the preceding paragraph, wherein the friction clutch includes a central wedge member for expanding the clutch having a guide extension thereon slidingly telescoped within the buffer head to support the latter against drooping.

A more specific object of the invention is to provide a friction buffer comprising a combined housing and friction shell; a buffer head having a sleeve portion telescoped within the housing; a friction clutch including a wedge block and friction shoes slidingly engaging interior friction surfaces on the combined housing and friction shell; spring means yieldingly opposing inward movement of the friction clutch; and a preliminary spring interposed between the buffer head and wedge, yieldingly opposing inward movement of the head, wherein the buffer head, combined housing and friction shell, and clutch are held against relative rotation during all stages of operation of the mechanism, by interengaging guide ribs and grooves on the buffer head and combined housing and friction shell, which are in operative engagement throughout the greater portion of the compression and release strokes of the mechanism, and interengaging guide means on the buffer head and wedge block of the clutch which, at such times when the cooperating guide ribs and grooves of the buffer head and combined housing and friction shell become disengaged, is effective to lock the buffer head and combined housing and friction shell against relative rotation, and wherein the guide means on the wedge block which cooperates with the guide means on the buffer head is formed on an extension of the wedge block, which extension is slidingly telescoped within the sleeve portion of the buffer head to support the same.

Other objects of the invention will more clearly appear from the description and claims hereinafter following.

In the drawing forming a part of this specification, Figure 1 is a longitudinal, vertical sectional view of my improved buffer mechanism, illustrating the same mounted in position on the end of a railway car. Figures 2, 3, and 4 are transverse, vertical sectional views, corresponding respectively to the lines 2—2, 3—3, and 4—4 of Figure 1.

As shown in the drawing, my improved buffer mechanism comprises broadly a housing A; a buffer head B; three friction shoes C—C—C; a wedge block D; a main spring resistance E; and a preliminary spring resistance F.

The housing A is in the form of a hollow tubular casing closed by a transverse, vertical wall 10 at the rear end thereof. The wall 10 is extended laterally outwardly beyond the housing at opposite sides thereof to provide flanges 11—11 for securing the housing to the end of a railway car, the same being preferably secured by bolts or similar securing elements extending through said flanges and the end wall of the car. The forward end portion of the housing A, which is open, is of cylindrical, transverse cross section, as indicated at 12, and rearwardly of said cylindrical portion 12 the housing is of hexagonal, transverse cross section, thereby providing a friction shell portion 13 of hexagonal shape. At the forward end of the shell portion 13, where it joins the cylindrical portion 12 of the housing A, the walls are interiorly thickened, as indicated at 14. At said thickened wall portion 14 of the shell 13 are provided three interior friction surfaces 15—15—15 of V-shaped, transverse cross section, each surface 15 being formed by two adjacent, interior face portions of the wall of the hexagonal shell. At the extreme forward end, the cylindrical portion of the housing is provided with three circumferentially spaced, inturned flanges 16—16—16 forming stop shoulders for limiting outward movement of the buffer head B. The openings between the flanges 16—16—16 provide three passages 17—17—17 for a purpose hereinafter described.

The friction shoes C, which are three in number, cooperate with the V-shaped, interior friction surfaces 15 of the friction shell 13. Each friction shoe has a friction surface 18 on the outer side thereof of V-shaped, transverse cross section engaging the corresponding V-shaped friction surface 15 of the shell. As will be evident, the shoes are thus restricted to movement in a direction lengthwise of the casing and cannot creep or rotate around the same. On the inner side, each shoe has a wedge face 19 of V-shaped, transverse cross section, the faces 19—19—19 of the three shoes converging inwardly or rearwardly of the shell 13.

The wedge D is in the form of a block having a forwardly extending, tubular guide sleeve portion 20 formed integral therewith. At the inner or rear end thereof, the wedge D has three rearwardly converging wedge faces 21—21—21 which are of V-shaped, transverse cross section and engage respectively with the V-shaped wedge faces 19—19—19 of the three shoes. To limit outward movement of the wedge D and hold the same assembled with the housing A, three radial lugs 22—22—22 are provided on the wedge which extend between adjacent shoes and engage in back of three interior stop lugs 23—23—23 formed on the shell 13, said lugs being at the forward ends of the friction surfaces. In addition to forming retaining means for the wedge, the lugs 22 prevent relative rotation of the wedge with respect to the housing A by engagement of said lugs between adjacent shoes, which shoes, as hereinbefore pointed out, are held against rotary displacement with respect to the housing through the interengaging V-shaped friction surfaces of the housing and shoes.

The buffer head B comprises a cylindrical sleeve which is open at the rear end and closed at the front end by a transverse wall 24. The wall 24 extends laterally outwardly of the cylindrical sleeve portion of the buffer head, thereby providing an annular flange 25 which forms a continuation of the wall 24. The wall 24, together with the flange 25, forms the buffer head proper of the mechanism. At the inner end, the sleeve portion of the buffer head is provided with three laterally, outwardly extending retaining lugs or flanges 26—26—26, which are spaced equally circumferentially of the sleeve. The lugs 26—26—26 of the sleeve of the buffer head are guided for lengthwise movement in guideways 27—27—27 formed by lengthwise extending ribs 28—28, 28—28, and 28—28 on the interior of the cylindrical portion of the housing A, immediately to the rear of the stop flanges 16—16—16 thereof. The ribs 28—28 of each pair extend rearwardly from opposite ends of the corresponding stop flange 16. To facilitate assembling of the buffer head with the housing, the ribs 28—28 are made of such a length that they guide the flanges 26 of the sleeve of the buffer head during part only of the compression stroke of the mechanism, the flanges 26 passing clear of the rear ends of the ribs to permit turning of the buffer head in the housing A while the parts are being assembled to allow the flanges 26 to be brought into alignment with the ribs after the buffer head has been telescoped within the housing. In this connection, it is pointed out that in assembling the sleeve end of the buffer head in the housing, the head is turned, from the normal position shown in Figure 2, to such an extent that the flanges 26 are aligned with the openings 17 at the front end of the housing.

The sleeve 20 of the wedge D slidingly fits within the sleeve portion of the buffer head B and supports the latter in its sliding movements to prevent sagging or drooping thereof with respect to the housing. As most clearly shown in Figure 1, which illustrates the normal full release position of the buffer, the sleeve 20 of the wedge D is spaced inwardly from the front end wall 25 of the buffer head, thereby providing for a certain amount of inward movement of the buffer head before the wall 24 engages the sleeve 20 to positively move the wedge inwardly of the housing.

At the forward end thereof, the sleeve 20 of the wedge D is notched at spaced intervals, as indicated at 29, to provide inwardly tapered slots within which are engageable interior ribs 30 of tapered formation at the forward end of the cylindrical sleeve portion of the buffer head B to lock the buffer head and wedge against relative rotation when the buffer head has been moved inwardly of the housing to a predetermined extent, that is, when the flanges 26 of the buffer head leave the guideways 27 of the housing. As herein disclosed, three sets of such cooperating ribs and grooves are employed. The parts are so proportioned that the ribs 30 of the buffer head B engage within the slots 29 of the wedge before the flanges or lugs 26 of the buffer head leave the guideways 27 between the ribs 28—28 of the housing A.

The spring resistance E comprises inner and outer coils bearing at their rear ends on the transverse end wall 10 of the housing A and at their forward ends on the inner ends of the wedge D and the shoes C, respectively. The spring resistance E is preferably under initial compression in the assembled condition of the mechanism.

The spring F, which forms the preliminary spring means of the mechanism comprises a single helical coil seated at its front end on the transverse wall 24 of the buffer head and having its rear end portion seated in the sleeve 20 of the wedge D. The combined resistance to movement provided by the spring resistance E, together with the friction clutch comprising the wedge D and the shoes C—C—C, is such that the preliminary spring F is compressed between the buffer head and wedge until the latter is positively engaged and moved by said buffer head.

In assembling the mechanism, the spring resistance E, the shoes C—C—C, and the wedge D are first placed within the housing. The parts are then compressed by forcing the wedge D inwardly of the housing and are locked in such compressed condition by any suitable clamping device, such as a T-headed retainer bolt, which extends through aligned openings 31 and 32 in the wedge D in the rear wall 10 of the housing. These openings are transversely elongated to permit passage of the T-head of the bolt therethrough. As will be evident, the T-head of the bolt is anchored to the wedge by shouldered engagement therewith through rotation of the bolt through an angle of 90°. While the parts are held thus compressed, the preliminary spring F is seated in the sleeve 20 of the wedge D and the sleeve portion of the buffer head is engaged over the sleeve 20 and telescoped within the housing A, the buffer head being previously turned to such a position that the flanges 26—26—26 thereof will pass between the flanges 16—16—16 of the housing A. The buffer head is pushed inwardly against the resistance of the spring F until the flanges 26—26—26 clear the rear ends of the ribs 28—28, 28—28, and 28—28. This operation may be readily performed on account of the clearance provided by the position of the wedge D as held by the T-headed retainer bolt, as hereinbefore pointed out. After the buffer head B has been forced inwardly of the housing A to an extent to clear the inner ends of the ribs 28—28, the head is turned to align the flanges 26—26—26 with the flanges 16—16—16 of the housing A, that is, bring the flanges into alignment with the guideways 27—27—27. In this position of the buffer head B, the ribs 30—30—30 thereof are aligned with the slots 29—29—29 of the sleeve 20 of the wedge B. When the parts have been thus assembled, the retainer bolt is removed by withdrawing the same through the rear end of the housing A, thus permitting the mechanism to expand and assume the position shown in Figure 1.

The operation of my improved buffer mechanism is as follows: Upon inward movement of the buffer head B, through pressure exerted thereon by any object, such as the buffer head of an adjacent car, the preliminary spring F is compressed against the wedge D, thus absorbing the lighter shocks. When heavier shocks are encountered, the head B is forced further inwardly engaging the sleeve 20 of the wedge D and forcing the latter inwardly of the friction shell section of the housing, thus wedging the shoes apart, pressing the same against the friction surfaces of the shell, and forcing them inwardly against the resistance of the spring E. High frictional resistance is thus provided during the time that this friction shock absorbing means is operated. When the actuating pressure is removed, the expansive action of the spring E forces the friction shoes and wedge outwardly until movement of the wedge is limited by shouldered engagement thereof with the lugs 23—23—23 of the housing A, and the expansive action of the spring F forces the buffer head B outwardly until limited by engagement of the flanges 26 thereof with the flanges 16 of the housing.

In this connection, it is pointed out that during both the entire compression stroke and release action of the mechanism, the buffer head B is effectively interlocked with the housing A to guard against accidental separation of these parts, the flanges 26—26—26 of the head B being guided in thee guideways 27—27—27 of the housing A and the ribs 30 of the head being engaged within the slots 29 of the sleeve 20 of the wedge D before the flanges 26 of the head B pass rearwardly beyond the ends of the ribs 28—28, 28—28, and 28—28 of the housing in the compression stroke of the mechanism, and the ribs 30—30—30 remaining engaged with the slots 29—29—29 of the wedge until the flanges 26—26—26 have reentered between the ribs 28—28, 28—28, and 28—28 in the expansion stroke of the mechanism.

I claim:

1. In a buffer for railway cars, the combination with a housing adapted to be secured to the car; of a friction clutch in sliding frictional engagement with the interior of the housing, said friction clutch including a wedge member; a spring within the housing opposing inward movement of the clutch; a buffer head having a sleeve portion rigid therewith and slidingly telescoped within the housing; a guide projection on said wedge member rigid therewith, telescoped within the sleeve portion of the buffer head and slidingly fitting said sleeve of the buffer head to support the latter against sagging; and spring means interposed and reacting between the buffer head and the friction clutch yieldingly resisting inward movement of the buffer head with respect to the clutch.

2. In a buffer for railway cars, the combination with a housing open at one end and closed at the other end; of a buffer head movable inwardly toward the housing, said buffer head including a sleeve portion slidingly telescoped within the housing; a friction clutch slidable inwardly of the housing, said clutch including a wedge member; a forwardly projecting guide sleeve on said wedge member rigid therewith, telescoped within the sleeve portion of the buffer head, said guide sleeve closely fitting said sleeve of the buffer head to support the latter against sagging; cooperating stop lugs on the housing and sleeve of said head limiting outward movement of the head; internal lengthwise extending guide ribs on the housing between which the lugs of the guide sleeve are engaged and guided during part of the compression stroke of the mechanism to hold said head against rotation with respect to the housing; cooperating guide ribs and slots on the buffer head and sleeve of the wedge for guiding said head and restricting the same to lengthwise movement with respect to the housing during the remainder of the compression stroke of the mechanism; a main spring yieldingly opposing inward movement of the clutch; and a preliminary spring yieldingly opposing inward movement of the buffer head with respect to the wedge member.

3. In a buffer for railway cars, the combination with a housing having interior friction surfaces; of friction shoes slidingly engaging said friction surfaces; a wedge in wedging engagement with the shoes; spring means opposing inward movement of the wedge and shoes; an inwardly movable buffer head having a sleeve portion telescoped within the housing; a forwardly extending sleeve on said wedge rigid therewith, said sleeve having a sliding telescopic fit within the sleeve of the buffer head to support the latter against sagging; a second spring yieldingly opposing relative approach of the buffer head and wedge lengthwise of the mechanism, said spring extending into the sleeve of the wedge; means for holding the wedge against rotation with respect to the housing; means for holding said buffer head against rotation with respect to the housing during part of the compression stroke of the mechanism; and means for holding said buffer head and wedge against relative rotation during the remainder of the compression stroke including internal, lengthwise extending ribs on the buffer head and cooperating, lengthwise extending slots on the sleeve of the wedge.

4. In a buffer for railway cars, the combination with a housing open at one end and closed at the other end; of a buffer head including a rearwardly extending sleeve slidingly telescoped within the housing, said housing including a friction shell section; friction shoes slidable in said friction shell section and limited to lengthwise movement with respect to the same; a wedge block in wedging engagement with the shoes; lugs on said wedge block engaged between adjacent shoes to hold the wedge against rotation with respect to the shoes; a forwardly projecting guide sleeve on said wedge block slidingly telescoped within the sleeve of the buffer head; stop shoulders on the friction shell section engageable with said lugs to limit outward movement of the wedge block; cooperating lugs on the housing and sleeve of the buffer head for limiting outward movement of the head; internal guideways on the housing with which said lugs of the head are slidingly engaged to limit the latter to lengthwise movement with respect to the housing during part of the compression stroke of the mechanism; means for limiting the buffer head to lengthwise movement with respect to said wedge block during the remainder of the compression stroke of the mechanism, comprising interior ribs on the sleeve of the buffer head at the forward end of the latter and slots at the forward end of the sleeve of the wedge within which said ribs are engageable; spring means reacting between the housing and wedge and shoes yieldingly opposing inward movement of the wedge and shoes; and spring means reacting between the buffer head and the wedge yieldingly opposing inward movement of the buffer head with respect to the wedge.

5. In a buffer for railway cars, the combination with a housing having interior friction surfaces; of a friction clutch slidingly engaging said friction surfaces, said clutch including a wedge held against rotation with respect to the housing; spring means yieldingly opposing inward movement of said friction clutch; a forwardly projecting guide sleeve on the wedge provided with guide slots at the forward end thereof; a buffer head including a rearwardly extending sleeve slidingly telescoped within said housing and slidingly receiving the sleeve of the wedge; means for restricting said buffer head to lengthwise movement with respect to the housing, comprising interengaging guide means on the head and housing operative during part of the compression stroke of the mechanism, and internal guide ribs at the forward end of the sleeve of the buffer head engageable within the slots of the sleeve of the wedge during the remainder of the compression stroke; and a preliminary spring reacting between the buffer head and wedge yieldingly resisting relative movement of the head and wedge toward each other.

GEORGE E. DATH.

REFERENCES CITED

The following references are of record in the file of this patent:

UNITED STATES PATENTS

| Number | Name | Date |
|---|---|---|
| 992,428 | Johnson | May 16, 1911 |
| 2,340,335 | Marsh | Feb. 1, 1944 |